UNITED STATES PATENT OFFICE 2,495,772

BETA-(2-BIPHENYLOXY)ETHYL BETA-HALOALKYL AMINES

George Rieveschl, Jr., and Robert W. Fleming, Grosse Pointe Woods, Mich., assignors to Parke, Davis & Company, Detroit, Mich., a corporation of Michigan No Drawing. Application February 7, 1947, Serial No. 727,287

6 Claims. (Cl. 260—570.7)

This invention relates to a new class of beta-(2 - biphenyloxy)ethyl beta - haloalkyl amines. More particularly, the invention relates to substituted β - (2 - biphenyloxy)ethyl β - haloalkyl amines and their acid addition salts. The free bases of the compounds of the present invention have the formula,

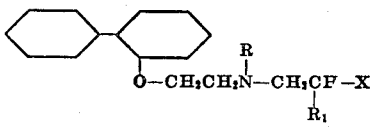

where R is a lower alkyl or alkenyl radical, $R_1$ is hydrogen or methyl and X is a chlorine or bromine atom.

It has been discovered that the compounds of the invention may be obtained by the action of a halogenating agent on the free base or an acid addition salt of a compound of the formula,

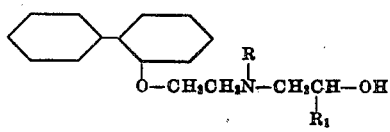

where R and $R_1$ have the same significance as given above. Some of the halogenating agents which may be used to effect this transformation are thionyl chloride, thionyl bromide, phosphorus oxychloride, phosphorus oxybromide, phosphorus trichloride, phosphorus tribromide, phosphorus pentachloride and the like. The reaction may be carried out by heating the two reactants for a short time in the presence or absence of a solvent although in some instances, such as when thionyl chloride or bromide is used, the desired result may also be obtained by merely allowing the two reactants, in contact with one another, to stand at room temperature. In general, an excess of the halogenating agent is used and in some cases this excess also serves as a solvent for the reaction.

The compounds of the present invention are powerful sympatholytic agents and because of this ability to block the pressor effect of epinephrine they are especially useful in the treatment of peripheral vascular diseases and neurogenic hypertension. These compounds also possess an extremely high degree of antihistamine activity and therefore are suitable in the treatment of allergic conditions due to histamine. They may be administered, preferably as the salts of the bases, either orally or intravenously. The usual intravenous dosage is about 10 to 20 mg. while the oral dosage is about 50 to 100 mg.

The invention is illustrated by the following examples.

*Example 1.* — β - (2-biphenyloxy)ethyl-β-chloroethyl-methyl-amine

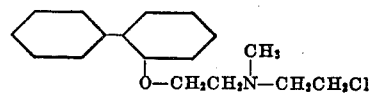

36.1 g. of the oxalate salt of β-(2-biphenyloxy)-ethyl-β-hydroxyethyl-methyl-amine is dissolved in water and the resulting solution made alkaline with potassium hydroxide solution. The free base is extracted with ether, the ether extract dried and the ether evaporated. The residual free base is heated on a steam bath for one hour with 30 cc. of thionyl chloride, cooled and the solution diluted with ether. The hydrochloride salt of the desired product which separates from the solution is collected and purified by recrystallization from either isopropanol or isopropanol-ether mixture; M. P. 168–70° C.

*Example 2.* — β - (2-biphenyloxy)ethyl-β-chloroethyl-ethyl-amine

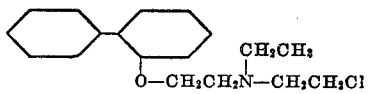

15 g. of the oxalate salt of β-(2-biphenyloxy)-ethyl-β-hydroxyethyl-ethyl-amine is dissolved in water and the solution made alkaline with potassium hydroxide solution. The free base is extracted with ether, the ether extracts dried and the ether distilled. The residual free base is treated with 12 cc. of thionyl chloride, heated on a steam bath for fifteen minutes and allowed to stand overnight. The mixture is diluted with ether, filtered and the hydrochloride of β-(2-biphenyloxy)ethyl-β-chloroethyl-ethyl - amine purified by recrystallization from isopropanol-ether mixture; M. P. 165–6° C.

*Example 3.* — β - (2-biphenyloxy)ethyl-β-bromoethyl-ethyl-amine

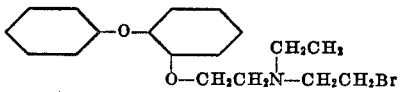

A mixture consisting of 35 g. of β-(2-biphenyloxy)-ethyl-β-hydroxyethyl-ethyl-amine and 250 cc. of phosphorus oxybromide is heated at 125° C. with stirring for three hours and then the phosphorus oxybromide distilled off the reaction mixture under reduced pressure. The residue is added to 750 g. of ice and the resulting mixture allowed to stand for one hour. 350 cc. of ether is added and the solution made alkaline in the cold with 10 N sodium hydroxide solution. The ether layer is separated and the aqueous solution extracted with several portions of ether. The combined ether extracts are dried for a few minutes over anhydrous potassium carbonate and the drying agent removed by filtration. The ether filtrate can be evaporated under reduced pressure to obtain the free base of the desired β-(2-biphenyloxy)-ethyl-β-bromoethyl-ethyl-amine or it may be used to prepare the acid addition salts of the free base. For example, the citrate salt is prepared by treating a portion of the ether filtrate with an ether solution containing an equivalent amount of citric acid. The citrate salt which separates is collected and purified by washing with ether. The hydrohalide salts such as the hydrochloride and hydrobromide salts may be prepared by passing gaseous hydrogen chloride or hydrogen bromide into the ether solution of the free base. The hydrohalide salt which separates is collected and purified by recrystallization from isopropanol-ether mixture.

*Example 4.—β-(2 - biphenyloxy)ethyl-β-chloroethyl-n-propyl-amine*

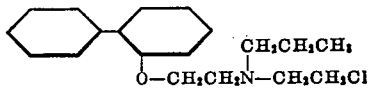

20.1 g. of the oxalate salt of β-(2-biphenyloxy)-ethyl-β-hydroxyethyl-n-propyl-amine is treated with 25 cc. of thionyl chloride and the mixture warmed on a steam bath for ten minutes. The reaction mixture is diluted to 200 cc. with ether, the solution allowed to stand and the crystalline hydrochloride of β - (2 - biphenyloxy)ethyl - β - choroethyl-n-propyl-amine collected. After recrystallization from isopropanol or isopropanol-ether mixture the salt melts at 164–6.5° C.

*Example 5.—β - (2-biphenyloxy)ethyl-β-chloroethyl-isopropyl-amine*

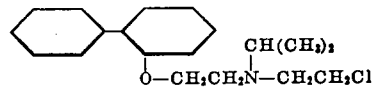

20 g. of β - (2 - biphenyloxy)ethyl-β-hydroxyethyl-isopropyl-amine is added slowly with stirring to 30 cc. of thionyl chloride in an ice bath. After the addition has been completed the mixture is allowed to come to room temperature and then it is heated on a steam bath for about twenty minutes. The mixture is diluted to 250 cc. with ether, the crystalline hydrochloride of β-(2 - biphenyloxy)ethyl - β - chloroethyl - isopropyl-amine collected and recrystallized from isopropanol-ether mixture; M. P. 131–3° C.

*Example 6.—β - (2-biphenyloxy)ethyl-β-chloroethyl-allyl-amine*

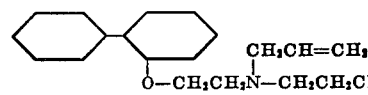

29.7 g. of β-(2-biphenyloxy)ethyl-β-hydroxyethyl-allyl-amine in 20 cc. of benzene is added slowly to 30 cc. of thionyl chloride while cooling the mixture by means of an ice bath. After the addition has been completed the mixture is allowed to come to room temperature and then it is heated on a steam bath for about twenty minutes. The reaction mixture is cooled, diluted to about 500 cc. with dry ether and the crystalline hydrochloride of β - (2 - biphenyloxy)ethyl-β-chloroethyl-allyl-amine collected. After recrystallization from isopropanol-ether mixture the salt melts at 125–7° C.

*Example 7.—β-(2-biphenyloxy)ethyl-β-chloroethyl-n-butyl-amine*

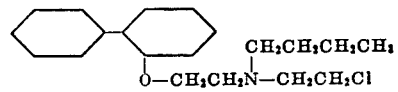

31.3 g. of β-(2-biphenyloxy)ethyl-β-hydroxyethyl-n-butyl-amine is added slowly to 30 cc. of thionyl chloride while cooling the mixture by means of an ice bath. The reaction mixture is allowed to come to room temperature and then it is heated on a steam bath for fifteen minutes. Addition of about 500 cc. of dry ether to the cool reaction mixture causes the separation of a viscous oil which crystallizes on rubbing. The liquid is decanted and the crude hydrochloride salt of β-(2-biphenyloxy)ethyl-β-chloroethyl-n-butyl-amine washed with several fresh portions of dry ether. The crude salt is purified by recrystallizing it several times from isopropanol-ether mixture; M. P. 117–8° C.

*Example 8.—β-(2-biphenyloxy)ethyl-β-chloroethyl-isobutyl-amine*

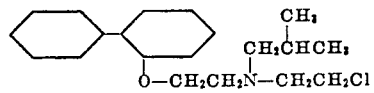

30 g. of β-(2-biphenyloxy)ethyl-β-hydroxyethyl-isobutyl-amine is added dropwise to 25 cc. of thionyl chloride with stirring while maintaining the temperature below about 10° C. After the addition has been completed the mixture is warmed on a steam bath for about one-half hour, cooled and diluted to about 250 cc. with dry ether. The mass which crystallizes on stirring is collected and washed with ether. The crude β-(2-biphenyloxy)ethyl-β-chloroethyl-isobutyl-amine hydrochloride is purified by recrystallization from isopropanol-ether mixture; M. P. 155–6° C.

*Example 9.—β-(2-biphenyloxy)ethyl-β-bromoethyl-isobutyl-amine*

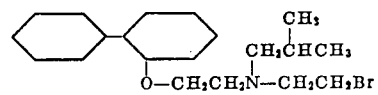

30 g. of β-(2-biphenyloxy)ethyl-β-hydroxyethyl-isobutyl-amine is added dropwise to 50 cc. of thionyl bromide keeping the temperature below 10° C. After the addition has been completed the mixture is warmed on a steam bath for one-half hour, cooled and diluted to about 400 cc. with dry ether. The hydrobromide salt of the desired β-(2-biphenyloxy)ethyl-β-bromoethyl-isobutyl-amine which separates is collected and purified by recrystallization from isopropanol-ether mixture.

*Example 10.—β-(2-biphenyloxy)ethyl-β-chloroethyl-sec.-butyl-amine*

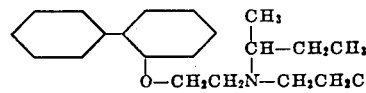

10.8 g. of β-(2-biphenyloxy)ethyl-β-hydroxyethyl-sec.-butyl-amine in 10 cc. of benzene is added slowly to 15 cc. of thionyl chloride while cooling the mixture by means of an ice bath. After the addition is complete the mixture is warmed for fifteen minutes on a steam bath, cooled and diluted to 250 cc. with dry ether. The crude hydrochloride salt of β-(2-biphenyloxy)- ethyl-β-hydroxyethyl-sec.-butyl-amine is collected and purified by recrystallization from isopropanol-ether mixture; M. P. 157.5–8° C.

*Example 11.—β-(2-biphenyloxy)ethyl-β-chloroethyl-n-amyl-amine*

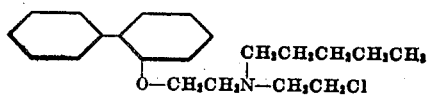

30 g. of β-(2-biphenyloxy)ethyl-β-hydroxyethyl-n-amyl-amine is added slowly to 25 cc. of thionyl chloride keeping the temperature below 10° C. during the addition. The mixture is heated on a steam bath for one-half hour, cooled and diluted to 350 cc. with dry ether. The oily hydrochloride salt of β-(2-biphenyloxy)ethyl-β-chloroethyl-n-amyl-amine which crystallizes on rubbing is collected and recrystallized from isopropanol-ether mixture; M. P. 113–5° C.

*Example 12.—β-(2-biphenyloxy)ethyl-β-chloroethyl-n-hexyl-amine*

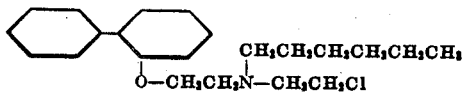

34.1 g. of β-(2-biphenyloxy)ethyl-β-hydroxyethyl-n-hexyl-amine is slowly added with stirring to 30 cc. of thionyl chloride cooled by means of an ice bath. After all the hydroxy amine has been added the mixture is heated on a steam bath for a short time, cooled and diluted to 400 cc. with dry ether. The ether is decanted from the dark colored oil and the oil crystallized by rubbing it with a fresh portion of dry ether. The crystalline hydrochloride salt of β-(2-biphenyloxy)ethyl-β-chlorethyl-n-hexyl-amine is collected and recrystallized from isopropanol-ether mixture; M. P. 100–102° C.

*Example 13.—β-(2-biphenyloxy)ethyl-β-chloropropyl-ethyl-amine*

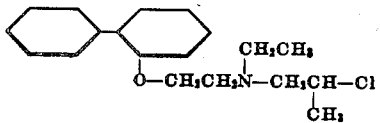

29.9 g. of β-(2-biphenyloxy)ethyl-β-hydroxypropyl-ethyl-amine is dissolved in about 15 cc. of dry benzene and the solution dropped slowly, with stirring, into 25 cc. of thionyl chloride cooled by means of an ice bath. After the addition has been completed the mixture is warmed on a steam bath for about one-half hour, cooled and diluted to 250 cc. with dry ether. The oily hydrochloride which separates from the solution is crystallized by rubbing. The ether is decanted, the crude salt washed with several fresh portions of ether and then collected. The crude product can be recrystallized from isopropanol-ether mixture to obtain the pure hydrochloride salt of β-(2-biphenyloxy)ethyl-β-chloropropyl-ethyl-amine melting at 158–60° C.

*Example 14.—β-(2-biphenyloxy)ethyl-β-bromopropyl-n-propyl-amine*

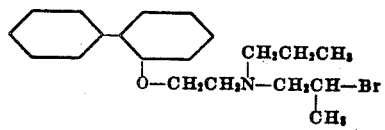

A mixture consisting of 30 g. of β-(2-biphenyloxy)-ethyl-β-hydroxypropyl-n-propyl-amine and 150 cc. of phosphorus oxybromide is stirred and heated at about 125° C. for four hours and then the phosphorus oxybromide distilled off under reduced pressure. The residue is treated with about 750 g. of ice and allowed to stand for about an hour. The solution is covered with ether and made alkaline with 10 N sodium hydroxide in the cold. The ether layer is separated, the solution extracted with several portions of ether and the combined ether extracts dried for a few minutes over anhydrous potassium carbonate. The drying agent is removed by filtration and the filtrate containing the free base of the desired product treated with an excess of dry, gaseous hydrogen bromide. The precipitated hydrobromide salt of β-(2-biphenyloxy)ethyl-β-bromopropyl-n-propyl-amine is collected and recrystallized from isopropanol-ether mixture.

Other salts such as the oxalate of β-(2-biphenyloxy)-ethyl-β-bromopropyl-n-propyl-amine may be prepared by evaporation of the ether from the ether filtrate of the free base and adding the base to a warm solution of isopropanol containing a molecular equivalent of oxalic acid. Ethyl acetate is added and on cooling the acid oxalate of β-(2-biphenyloxy)ethyl-β-bromopropyl-n-propyl-amine crystallizes out.

*Example 15.—β-(2-biphenyloxy)ethyl-β-bromopropyl-allyl-amine*

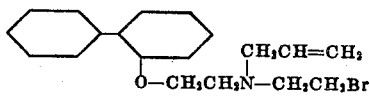

25 g. of β-(2-biphenyloxy)ethyl-β-hydroxypropyl-allyl-amine in 25 cc. of dry benzene is added dropwise with stirring to 45 cc. of thionyl bromide while maintaining the temperature below about 10° C. After all the hydroxy amine has been added the mixture is warmed on a steam bath for one-half hour, cooled and diluted to 400 cc. with dry ether. The hydrobromide of β-(2-biphenyloxy)ethyl-β-bromopropyl-allyl-amine which crystallizes on rubbing is collected and purified by recrystallization from isopropanol-ether mixture.

In its broader aspects the invention includes the quaternary ammonium compounds derived from the β-(2-biphenyloxy)ethyl-β-haloalkyl-amine products described above. The quaternary ammonium halides may be prepared by treating a free base of the new tertiary β-haloalkyl amine derivatives with an alkyl or aralkyl halide such as methyl iodide, ethyl bromide, benzyl chloride and the like, in an inert organic solvent. The quaternary ammonium sulfate and sulfonates can be prepared in an analogous manner by using reagents such as dimethyl sulfate, methyl benzene sulfonate and methyl toluene sulfonate instead of the alkyl or aralkyl halides. Some examples of the compounds which can be prepared by these methods are β-(2-biphenyloxy)ethyl-β-chloroethyl-dimethyl-ammonium iodide, β-(2-biphenyloxy)ethyl-β-chloroethyl-ethyl-methyl-ammonium benzene sulfonate, β-(2-biphenyloxy)ethyl-β-chloroethyl-diethyl-ammonium p-toluene sulfonate, β-(2-biphenyloxy)ethyl-β-chloroethyl-dimethyl-ammonium methosulfate and β-(2-biphenyloxy)ethyl-β-chloroethyl-ethyl-benzyl-ammonium chloride.

The substituted β-(2-biphenyloxy)ethyl-β-hydroxyalkyl amines used as starting materials for the preparation of the new halo amines of the present invention may be prepared as described in our copending application, Serial No. 727,286, filed February 7, 1947. According to the invention described in said copending application substituted β-(2-biphenyloxy)-ethyl-β-hydroxyalkyl amines may be produced by reacting a β-(2-biphenyloxy)-ethyl halide with an alkyl or alkenyl β-hydroxyalkyl amine in the presence or absence of an alkaline material. Such starting materials can also be prepared by reacting an alkyl or alkenyl β-(2-biphenyloxy)-ethyl amine with a β-hydroxyalkyl halide. A still further method of preparation consists in reacting ethylene oxide or 1,2-propylene oxide with an alkyl or alkenyl β-(2-biphenyloxy)-ethyl amine.

What we claim as our invention is:

1. A compound of the class consisting of a free base and its acid addition salts, said free base having the formula,

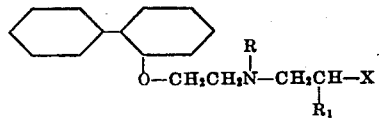

where R is a member of the class consisting of lower alkyl and lower alkenyl radicals, $R_1$ is a member of the class consisting of hydrogen and methyl and X is a member of the class consisting of chlorine and bromine.

2. A compound of the class consisting of a free base and its acid addition salts, said free base having the formula,

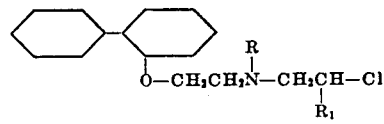

where R is a lower alkyl radical and $R_1$ is a member of the class consisting of hydrogen and methyl.

3. A compound of the class consisting of a free base and its acid addition salts, said free base having the formula,

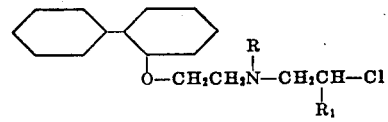

where R is a lower alkenyl radical and $R_1$ is a member of the class consisting of hydrogen and methyl.

4. The hydrochloride salt of a compound of the formula,

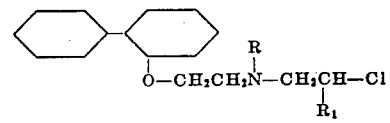

where R is a lower alkyl radical and $R_1$ is a member of the class consisting of hydrogen and methyl.

5. The hydrochloride salt of a compound of the formula,

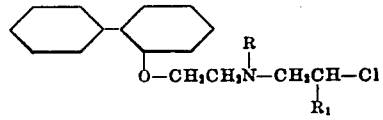

where R is a lower alkenyl radical and $R_1$ is a member of the class consisting of hydrogen and methyl.

6. Process for obtaining an acid addition salt of a compound of the formula,

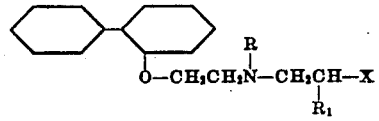

which comprises reacting a compound of the class consisting of a free base of the formula,

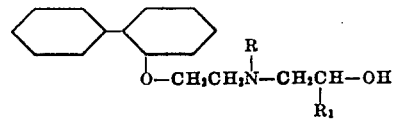

and acid addition salts thereof, with a halogenating agent, where R is a member of the class consisting of lower alkyl and lower alkenyl radicals, $R_1$ is a member of the class consisting of hydrogen and methyl and X is a member of the class consisting of chlorine and bromine.

GEORGE RIEVESCHL, Jr.
ROBERT W. FLEMING.

REFERENCES CITED

The following references are of record in the file of this patent:

UNITED STATES PATENTS

| Number | Name | Date |
|---|---|---|
| 2,187,723 | Alquist et al. | Jan. 23, 1940 |
| 2,217,660 | Alquist et al. | Oct. 15, 1940 |
| 2,252,828 | Alquist et al. | Aug. 19, 1941 |

OTHER REFERENCES

Allott, "Richter's Organic Chemistry" (Elsevier Publishing Co., Inc., 1944) 1, pages 161–162.